Figure 1:
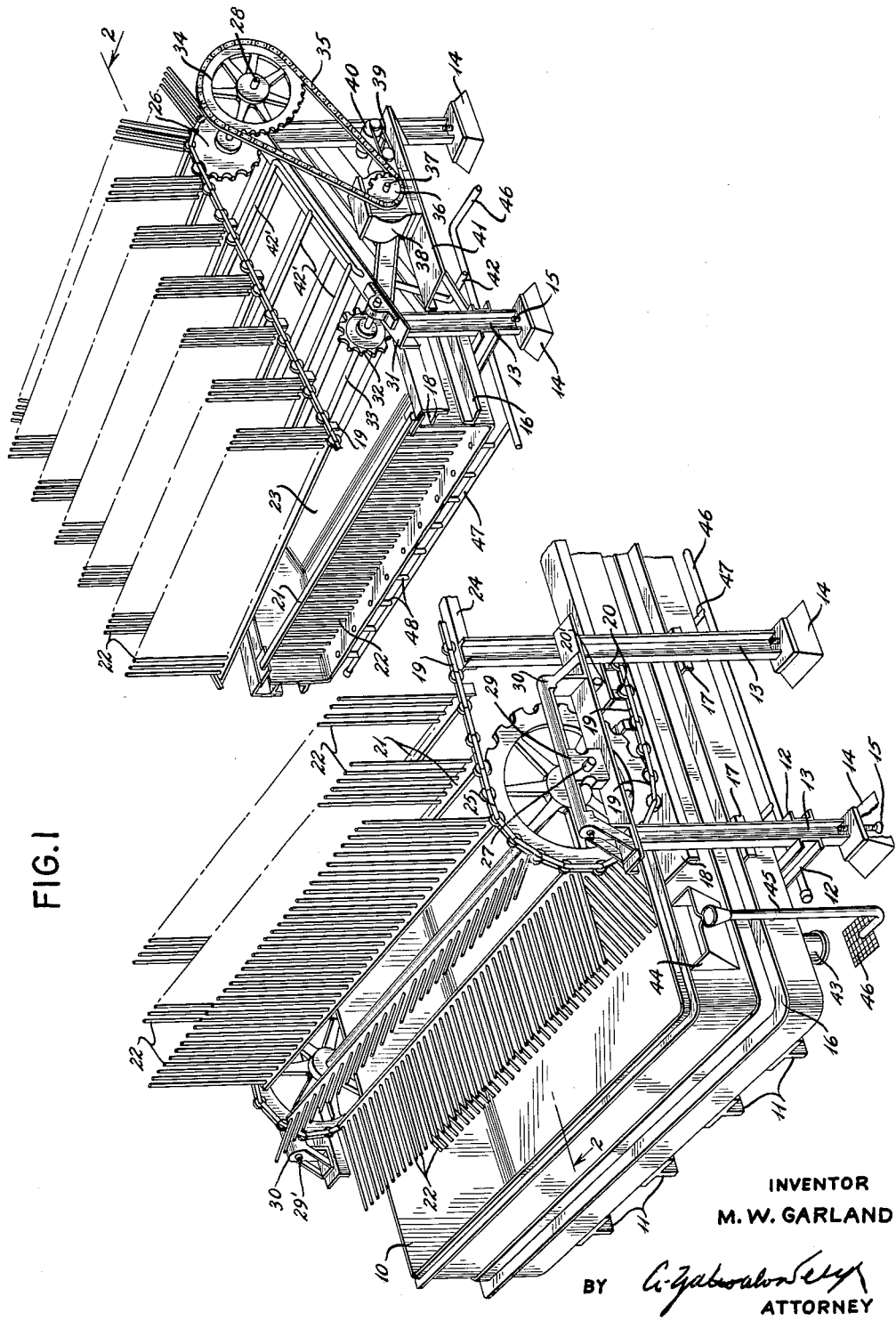

April 18, 1961 M. W. GARLAND 2,979,914
PRODUCT CHILLER
Filed Dec. 31, 1959 2 Sheets-Sheet 1

INVENTOR
M. W. GARLAND
BY
ATTORNEY

April 18, 1961 M. W. GARLAND 2,979,914
PRODUCT CHILLER
Filed Dec. 31, 1959 2 Sheets-Sheet 2

INVENTOR
M. W. GARLAND

BY
ATTORNEY

United States Patent Office 2,979,914
Patented Apr. 18, 1961

2,979,914

PRODUCT CHILLER

Milton W. Garland, Waynesboro, Pa., assignor to Frick Company, Waynesboro, Pa., a corporation of Pennsylvania Filed Dec. 31, 1959, Ser. No. 863,359

10 Claims. (Cl. 62—64)

This invention relates to the care and preservation of products of various kinds including foods for human consumption so that it is desirable and necessary to protect the same from extreme temperatures or to refrigerate in order to maintain them in satisfactory condition for use.

The invention is concerned particularly with the treatment of dressed poultry or other objects and including the reduction in temperature thereof employing in the refrigeration process potable water or water pure enough for human consumption.

In the processing of poultry it is the practice, after the birds are killed, to remove the feathers following the application of heat in various ways, such as by steam, water or wax, and then the birds are dressed by removal of excess portions. The resulting defeathered and dressed birds, which then may have a temperature of approximately 90° F. are washed and chilled to approximately 36° for subsequent processing, packing and storage.

Heretofore, poultry has been chilled in batches by placing the same in large tanks of water containing ice fragments. This requires a large amount of labor, both for the processing of the poultry and also for upkeep of the tanks, resulting in heavy wear on the floors, requiring a tremendous supply of and handling of ice and water for washing, and is accompanied by excessive handling of the poultry. In addition to the foregoing, it has been necessary to use a substantial amount of space for the tanks, ice storage, and the like. As a result, the processing has been inefficient, time-consuming and costly.

It is an object of the present invention to overcome the disadvantages and difficulties mentioned by an improved method and equipment adapted to accomplish the desired rapid reduction in temperature as well as washing of the poultry, in a simpler, more effective and advantageous manner and resulting in a superior product.

Another object is to provide apparatus and a method for the reduction of temperature of fowl and the like from a relatively high temperature of approximately 90 to 95° to a relatively low temperature of around 36°, by a continuous process, in a minimum of time, and at lease expense.

A further object is to provide an apparatus and method for the continuous washing and chilling of poultry, from an entering temperature of approximately 90 to 95° to a discharge temperature of approximately 36°, which may be carried out in a relatively small space with a minimum of labor and in which the fowl leaving the apparatus receives a final wash with incoming chilled potable water, and in which it is not necessary to use ice with its accompanying disadvantages.

A further object is to provide an apparatus and method by means of which cold potable water may be economically used, without recirculation through the product, for the rapid, efficient, and continuous chilling and washing of various products.

Figures 2, 3:
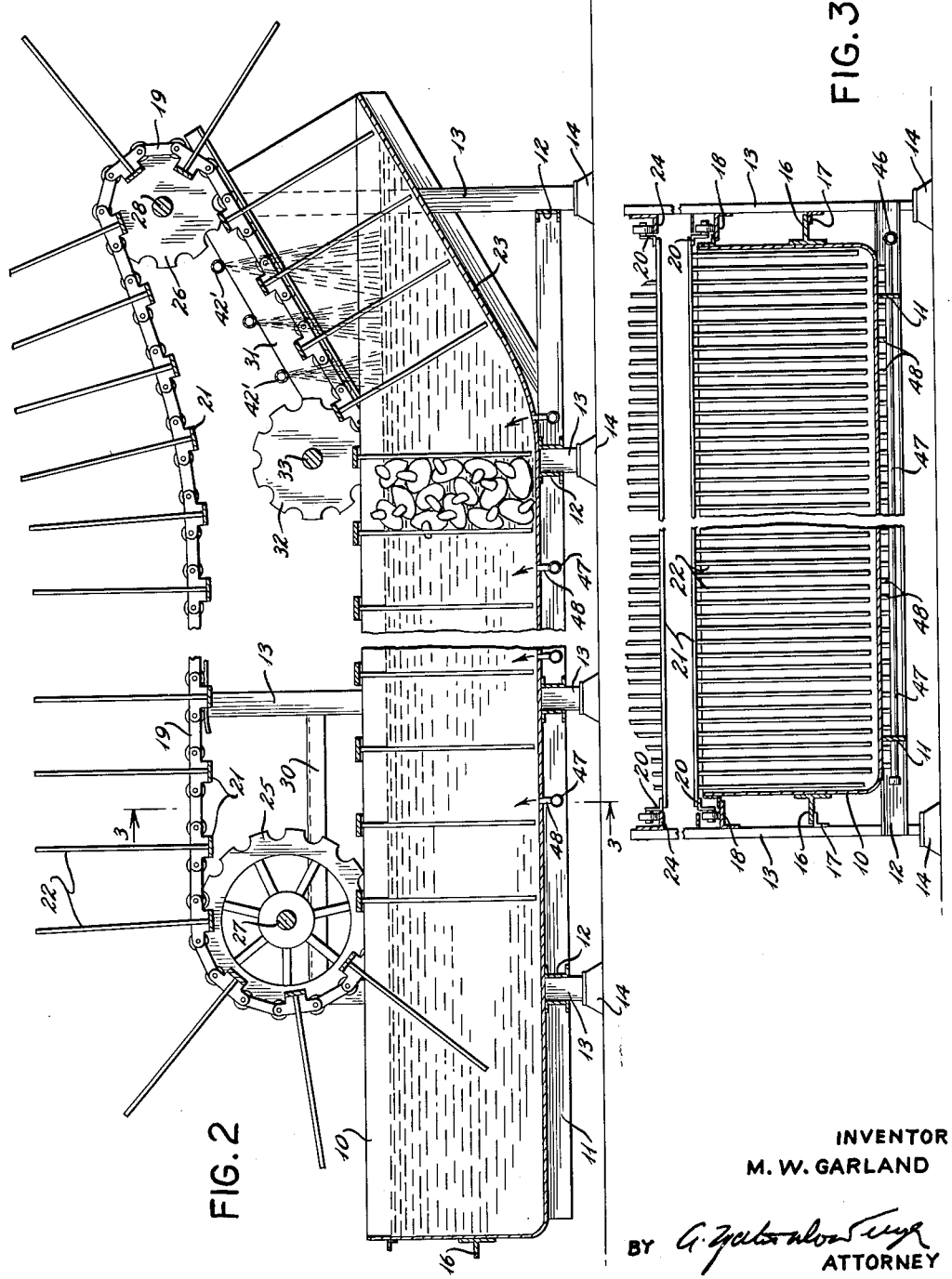

Other objects and advantages of the invention will be apparent from the following description taken in conjunction with the accompanying drawing wherein:

Fig. 1 is a perspective illustrating one application of the invention;

Fig. 2, a longitudinal section on the line 2—2 of Fig. 1; and

Fig. 3, a transverse section on the line 3—3 of Fig. 2.

Briefly stated, the invention is practiced by means of a relatively long flume or tank having an inclined bottom at one end forming a discharge ramp and into which cooling fluid such as cold potable water is introduced for flow through the flume and discharge at the opposite end. Mounted just above the flume is an endless conveyor carrying closely spaced rakes or sets of fingers which move slowly lengthwise thereof. Each rake consists of a transverse member having a projecting portion consisting of fingers or tines extending into the flume throughout substantially the entire cross section thereof in order to provide a firm support by means of which the product may be maintained in spaced relation as it is swept along the flume. The closely spaced rakes subdivide the flume into a plurality of compartments which are filled with the fowl or other product. The accompanying damming effect results in slow movement of the water through the flume and affords opportunity for heat exchange. In order to further increase the heat exchange, air headers are provided which introduce air into the flume at spaced intervals and thereby promote local circulation of the water.

With continued reference to the drawing, a relatively long narrow cooling tank or flume 10 adapted to contain a refrigerated liquid is mounted on longitudinal T bars 11 resting on cross bars 12 supported on leg forming channel members 13 having feet 14 and leveling devices 15.

The tank 10 is provided with reinforcing flanges 16 on opposite sides engaged by L-shaped brackets 17 welded or otherwise secured to the legs 13. Along each side of the tank an additional reinforcing member 18 has one edge attached to the legs 13 and forms a shelf or horizontal track for a roller conveyor chain 19 connected by brackets 20 to a cross member 21 with a series of such members being carried in spaced relation on the conveyor chain 19. Each member 21 is provided with a series of parallel tines or rake teeth 22 and is moved by the conveyor chain to sweep solid matter such as poultry or other material to be chilled through the tank and up an incline or ramp 23 where such matter is discharged from the tank and transported to a storage or shipping area in any desired manner.

The tines extend across the entire width of the tank 10 and into the same to a position close to the bottom, with the result that they provide a strong, sturdy sweeping member or rake extending through the cross section of the tank and capable of supporting and moving a heavy load therethrough and up the discharge end, but being sufficiently open to permit the passage of water. Because of their number and close spacing the tines may be of relatively small diameter and still provide an effective compartment wall for holding the poultry therebetween, without the danger of the product being damaged by being caught between the tines or between the tines and the tank wall. Instead of using tines to provide the sweeping member, other forms may be employed for carrying out the same purpose.

The conveyor 19 has its lower run resting on the track 18 and its upper run resting on an upper track 24 welded or otherwise attached to the upper extremity of the legs 13. Such conveyor is mounted on sprockets 25 and 26 carried by shafts 27 and 28 at the inlet and discharge ends respectively of the tank. In order to adjust the tension on the conveyor chain 19 the shaft 27 is mounted in a sliding block 29 on each side of the tank 10 and such blocks are movable longitudinally of the tank by screws 29' carried by a frame 30. The shaft 28 is mounted at opposite ends in pillow blocks attached to an angle bar 31 at the discharge end of the tank. An idler sprocket 32 mounted on a shaft 33 is provided at the base of the ramp so that the tines 22 will move along the bottom of the tank and up the ramp to remove the fowl from the refrigerated liquid.

The conveyor chain 19 is driven by a sprocket 34 mounted on one end of the shaft 28 and such sprocket is driven by a chain 35 from a sprocket 36 mounted on a drive shaft 37 of a gear reducing box 38 and such gear reducing box is driven by a belt 39 from a motor 40. The motor and gear reducing box are mounted on a platform 41 carried by the legs 13.

Chilled water or other refrigerating fluid is introduced into the tank through an inlet pipe 42 to overhead discharge pipes 42' having spaced outlets. The water thus introduced will flow through the tank to the opposite end thereof and be discharged from the tank through an overflow outlet 44 which is provided with a discharge pipe 45.

In order to agitate the water or other refrigerating fluid and thereby improve heat transfer, an air header 46 is located at the bottom of the tank 10 along one side thereof and such header supplies air to a plurality of transverse pipes 47 extending across the bottom of the tank. Each of the pipes 47 has a series of air discharge pipes 48 extending upwardly into the tank 10 so that air from the transverse pipes 47 is discharged into the tank 10. The pipes are preferably spaced at intervals approximating twice that between the rakes in order to provide adequate localized circulation of water in the compartments.

In the operation of the device, an operator working at the charging end of the tank loads poultry or other product to the full depth of the tank between a pair of spaced rakes. As the freshly loaded compartment advances and another is formed, it is similarly loaded. The result is that the compact and restrained position of the fowl across the entire cross section of the tank and to its full depth of liquid provides a damming action which greatly restricts the flow of water from end to end. However, some openings are present between the individual products and these permit gradual flow of water to the discharge end. The local circulation of water around the product is increased by the headers which constantly eject air under pressure into the tank at closely spaced intervals.

The poultry entering the tank, in a representative installation, is placed in water having a temperature of approximately 65° near the water discharge end, which is sufficiently cool to commence its rapid chilling. As the poultry is gradually swept along the flume it is brought into contact with progressively cooler water moving in counter-flow relationship and thereby further chilled, as well as washed. By the time it reaches the other end of the tank, which may require about 1½ hours, the poultry has been chilled to approximately 36°, or near the temperature of the water at the inlet which is in the neighborhood of 32 or 33°. To accomplish a final washing and cooling action the poultry moving up the discharge ramp is subjected to the rain of water discharging from the overhead pipes 42' at the poultry discharge end.

As a result of the counter-flow relationship between the product being chilled and the chilled water or other refrigerating fluid a wide temperature interchange is produced, and because all of the chilled fluid entering the flume is discharged through the overflow and not recirculated any and all trash such as pin feathers, loose pieces of flesh, coagulated blood, and the like entering with the incoming product is detached and floated away from the product and is discharged through the overflow, thus continually cleansing the product and trough in which it is conveyed.

Although the invention is not restricted to the size and proportions of the equipment, an example of the same is a flume approximately 54" wide, 30" deep, 54' long and fully capable of chilling 3000 birds of 2½ pounds average weight per hour of continuous operation from approximately 90° F. to 37° F. when supplied with 33 gallons per minute of 33° F. water, and with a chilling time of 1½ hours, the discharge water having a temperature of 55° F. to 65° F. The rakes are spaced at one foot intervals and hold approximately 101 birds weighing 2½ pounds each.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A product chiller comprising a relatively long narrow flume for the passage of water at a desired level therewithin and having an inclined ramp at one end from which a product within the flume may be discharged, an endless conveyor mounted with its lower run adjacent to the top of the flume and above the water level and an upper run above the lower run, said conveyor having a plurality of spaced rakes mounted transversely of the flume and of a size and configuration corresponding substantially to the cross section of the flume in order that the rakes carried on the lower run may extend into the water in the flume and thereby form a series of compartments therewithin for the reception and movement of the product to be chilled, the inclined discharge ramp being at such an angle that the end rakes moving from the lower to the upper run sweep the poultry up the incline for its discharge, means for introducing water into the product discharge end of the flume, said means comprising pipe means mounted transversely of the flume above the inclined discharge end and having a plurality of discharge openings, and means for producing localized agitation of water within the flume, said means comprising a plurality of spaced transverse headers for the passage of fluid and having a plurality of passages providing communication with the lower portion of the flume.

2. A product chiller comprising a relatively long narrow flume for the passage of water at a desired level therewithin and, an endless conveyor mounted with its lower run adjacent to the top of the flume and above the water level and an upper run above the lower run, said conveyor having a plurality of spaced rakes mounted transversely of the flume and of a size and configuration corresponding substantially to the cross section of the flume in order that the rakes carried on the lower run may extend into the water in the flume and thereby form a series of compartments therewithin for the reception and movement of the product to be chilled, means for introducing water into the product discharge end of the flume, said means comprising pipe means mounted transversely of the flume above the inclined discharge end and having a plurality of discharge openings, and means for producing localized agitation of water within the flume, said means comprising a plurality of spaced transverse headers for the passage of fluid and having a plurality of passages providing communication with the lower portion of the flume.

3. A product chiller comprising a relatively long narrow flume for the passage of water at a desired level therewithin and, an endless conveyor mounted with its lower run adjacent to the top of the flume and above the water level and an upper run above the lower run, said conveyor having a plurality of spaced rakes mounted transversely of the flume and of a size and configuration corresponding substantially to the cross section of the flume in order that the rakes carried on the lower run may extend into the water in the flume and thereby form a series of compartments therewithin for the reception and movement of the product to be chilled, means for introducing water into the product discharge end of the flume, and means for producing localized agitation of water within the flume, said means comprising a plurality of spaced transverse headers for the passage of fluid and having a plurality of passages providing communication with the lower portion of the flume.

4. A product chiller comprising a relatively long narrow flume for the passage of water at a desired level therewithin and, an endless conveyor mounted with its lower run adjacent to the top of the flume and above the water level and an upper run above the lower run, said conveyor having a plurality of spaced rakes mounted transversely of the flume and of a size and configuration corresponding substantially to the cross section of the flume in order that the rakes carried on the lower run may extend into the water in the flume and thereby form a series of compartments therewithin for the reception and movement of the product to be chilled, means for introducing water into the product discharge end of the flume, and means for producing localized agitation of water within the flume, said means comprising passages providing communication with the lower portion of the flume.

5. A product chiller comprising a tank having an inlet for material to be chilled and a discharge for such material after it has been chilled, said tank having an incline at its discharge end along which the chilled product is adapted to be moved in its discharge from the tank, an inlet for a refrigerating fluid adjacent said discharge end, an overflow outlet for said refrigerating fluid adjacent the inlet for material whereby said refrigerating fluid and the material to be chilled move in opposite directions, means whereby material to be chilled may be concentrated throughout substantially the width and depth of said tank to provide a damming and retarding action on the movement of the chilling medium, means for moving said material to be chilled through the tank, said means comprising a sweeping mechanism movable into said tank, and a plurality of air pipes for introducing air into said tank and causing agitation of said refrigerating fluid.

6. A product chiller comprising a tank having an inlet for material to be chilled and a discharge for the material after it has been chilled, said tank being inclined at its discharge end, an inlet for a potable refrigerating fluid adjacent to said discharge end, an overflow outlet for said refrigerating fluid at the opposite ends of said tank adjacent to said inlet for material whereby said refrigerating fluid and said material to be chilled move counter to each other, a reinforcing member forming a track disposed along each side of said tank parallel to the bottom of said tank and said incline, a roller conveyor chain supported by each of said tracks, a series of spaced cross members connecting said conveyor chains, each of said cross members having a plurality of parallel tines adapted to extend into said tank and terminate adjacent to the bottom thereof whereby movement of the conveyor chains will cause the product to be moved through said tank and up said incline to discharge said product from the tank, means for moving said conveyor chains, and a plurality of air inlet pipes for introducing air into said tank for agitating said refrigerating fluid.

7. A product chiller comprising a tank having an inlet for material to be chilled and a discharge for such material after it has been chilled, an inlet for refrigerating fluid adjacent such discharge, an overflow outlet for refrigerating fluid adjacent the inlet for material into which overflow outlet substance foreign to the material to be chilled may float away and be discharged as the material is introduced into the tank in which the chilling medium and the material to be chilled move in opposite directions, means whereby material to be chilled may be concentrated to extend throughout substantially the width and breadth of the tank and provide a damming and retarding action on the movement of the chilling medium, means for moving said material to be chilled slowly through said tank, means for supplying said refrigerating fluid in the form of potable water sufficient to permit a small overflow from said tank and thus conserve water, and means whereby fluid is introduced between the supply and discharge of the chilling medium and transversely of the path of flow of the chilling medium for causing localized agitation of said refrigerating fluid.

8. A product chiller as set forth in claim 7 and means for producing localized agitation of the chilling medium at spaced locations along the tank and across the direction of movement of the chilling medium and the matter to be chilled for accelerating heat transfer therebetween.

9. The method of chilling a product comprising supplying a chilling medium at a temperature near that to which the product is desired to be chilled into a space having length, depth, and width and discharging said chilling medium at a remote location from that of the supplying of the chilling medium, introducing the product into the chilling medium discharge portion of the space over the depth and width of the space in a concentration sufficient to provide a damming and retarding action on the flow of the chilling medium between the inlet and outlet of the chilling medium, supplying the chilling medium at a slow rate while moving the product in counter-flow relation along the space also at a slow rate, adding additional product in a like concentration for the full width and depth of the space, moving the same at a correspondingly slow speed along the space, directing agitating fluid between the supply and discharge of the cooling medium across the space and substantially at right angles to the direction of movement of the product and to the direction of flow of the chilling medium to produce agitation of the chilling medium and to accelerate heat transfer between the chilling medium and the product to be moved along said space in counter-flow relation, whereby the equalization of temperature between the chilling medium as it enters and as it is discharged will be prevented.

10. The method of claim 9 in which localized agitation of the chilling medium is provided across the direction of movement of the chilling medium and the product at spaced locations along the path of movement for increasing heat transfer between the chilling medium and the product to be chilled.

References Cited in the file of this patent

UNITED STATES PATENTS

| | | |
|---|---|---|
| 1,458,991 | Pique | June 19, 1923 |
| 1,907,649 | Marx | May 9, 1933 |
| 2,102,506 | Bland | Dec. 14, 1937 |
| 2,824,723 | Turney et al. | Feb. 25, 1958 |
| 2,825,927 | Lapeyre et al. | Mar. 11, 1958 |
| 2,854,827 | Lockerbie et al. | Oct. 7, 1958 |
| 2,920,462 | Roser et al. | Jan. 12, 1960 |
| 2,942,429 | Van Dolah et al. | Jan. 12, 1960 |